United States Patent [19]
Hashimoto et al.

[11] Patent Number: 5,578,376
[45] Date of Patent: Nov. 26, 1996

[54] MAGNETIC RECORDING MEDIUM HAVING A MAGNETIC LAYER COMPRISING A SPECIFIED FERROMAGNETIC METAL POWDER AND A SPECIFIED POLYURETHANE BINDER

[75] Inventors: Hiroshi Hashimoto; Masatoshi Takahashi; Yuuichirou Murayama; Tsutomu Okita, all of Kanagawa, Japan

[73] Assignee: Fuji Photo Film Co., Ltd., Kanagawa, Japan

[21] Appl. No.: 417,959

[22] Filed: Apr. 6, 1995

[30] Foreign Application Priority Data

Apr. 7, 1994 [JP] Japan ..................... 6-069713

[51] Int. Cl.$^6$ ..................... G11B 5/702
[52] U.S. Cl. ............... 428/425.9; 428/694 BU; 428/694 BL; 428/694 BA; 428/900
[58] Field of Search ............ 428/425.9, 694 BU, 428/694 BL, 694 BA, 900

[56] References Cited

U.S. PATENT DOCUMENTS

| | | | |
|---|---|---|---|
| 4,286,022 | 8/1981 | Vermillion et al. | 428/423.1 |
| 4,546,044 | 10/1985 | Asano et al. | 428/413 |
| 4,568,610 | 2/1986 | Lehner et al. | 428/425.9 |
| 5,153,079 | 10/1992 | Sasaki et al. | 428/694 |
| 5,413,862 | 5/1995 | Murata et al. | 428/423.1 |
| 5,415,941 | 5/1995 | Sugyo et al. | 428/425.9 |

FOREIGN PATENT DOCUMENTS

| | | |
|---|---|---|
| 61-104325 | 5/1986 | Japan . |
| 62-121922 | 6/1987 | Japan . |
| 3-201211 | 9/1991 | Japan . |

*Primary Examiner*—Stevan A. Resan
*Attorney, Agent, or Firm*—Sughrue, Mion, Zinn, Macpeak & Seas

[57] ABSTRACT

A magnetic recording medium comprising a non-magnetic support having thereon a magnetic layer comprising ferromagnetic powder and a binder, the ferromagnetic powder comprising a ferromagnetic metal powder comprising Fe and having a crystal size of from 120 to 250 Å and a Co content of from 5 to 40 atm %, and the binder comprises a polyurethane comprising a diol component and a polyisocyanate component, the diol component comprising a polyetherpolyol and a polyesterpolyol.

4 Claims, No Drawings

MAGNETIC RECORDING MEDIUM HAVING A MAGNETIC LAYER COMPRISING A SPECIFIED FERROMAGNETIC METAL POWDER AND A SPECIFIED POLYURETHANE BINDER

FIELD OF THE INVENTION

The present invention relates to a magnetic recording medium excellent in electromagnetic conversion characteristics, durability and long-term storage stability.

BACKGROUND OF THE INVENTION

The magnetic recording medium is widely used, for example, as a sound recording tape, a video tape or a floppy disk. The magnetic recording medium comprises a non-magnetic support having provided thereon a magnetic layer composed of a binder having dispersed therein ferromagnetic powder.

The magnetic recording medium must have various characteristics on a high level, such as electromagnetic conversion characteristics, running durability and running performance. More specifically, an audio tape for playing back a recorded music must have an ability to reproduce the original sound to a higher extent. A video tape must have a superior electromagnetic conversion characteristics such as excellent ability to reproduce the original image.

In addition to such superior electromagnetic conversion characteristics, the magnetic recording medium is required to have good running durability as described above. In order to achieve good running durability, the magnetic layer usually contains an abrasive and a lubricant.

However, for achieving good running durability with the use of an abrasive, the abrasive needs to be added in an increased amount to a certain degree and accordingly, the content of the ferromagnetic powder is reduced. Further, when an abrasive having a large particle size is used to achieve excellent running property, the abrasive is prone to project excessively on the surface of the magnetic layer. As a result, the improvement in running durability by the use of an abrasive is associated with a problem that the above-described electromagnetic conversion characteristics are deteriorated in many cases.

Furthermore, when the above-described running durability is improved by the use of a lubricant, the lubricant needs to be added in a large amount and accordingly, the binder is readily plasticized, thereby the durability of the magnetic layer is prone to be reduced.

The binder as a main component of the magnetic layer plays an important role in achieving improvement in the above-described durability and electromagnetic conversion characteristics. However, with a conventionally used binder such as a vinyl chloride resin, a cellulose resin, a urethane resin or an acrylic resin, the magnetic layer can have inferior abrasion resistance and involves a problem because it contaminates members in the running system for the magnetic tape.

In order to overcome such problems, a hard binder is used to increase the hardness of the magnetic layer. However, by increasing the hardness of the magnetic layer, the magnetic layer becomes brittle conspicuously to cause problems such as occurrence of the dropout upon abutting against the magnetic head or deterioration in the still characteristics.

JP-A-62-134819 (the term "JP-A" as used herein means an "unexamined published Japanese patent application") and JP-A-62-208423 disclose another countermeasure, in which the magnetic recording medium comprises a hydroxyl group not bonded directly to the main chain (bonded through an alkyl group or an alkylester group) and a vinyl chloride copolymer having a polar group and does not contain vinyl alcohol as the copolymer component. The vinyl alcohol as the copolymer component is produced through saponification and the polymer containing the vinyl alcohol hardly undergoes changes by aging, accordingly, the magnetic recording medium composed thereof is hardly changed by aging, has superior durability, exhibits excellent dispersibility of ferromagnetic powder due to the presence of a hydroxyl group and a polar group and is favored with good electromagnetic conversion characteristics.

However, in the above-described magnetic recording medium, the magnetic layer is not high in hardness and the surface of the magnetic layer is insufficient in smoothness and accordingly, the durability and the electromagnetic conversion characteristics cannot be sufficiently superior. As a result, it cannot be an adequately superior magnetic recording medium as a tape required to have extremely high smoothness and excellent electromagnetic conversion characteristics, for example, for S-VHS and 8 mm video.

Further, JP-B-63-55549 (the term "JP-B" as used herein means an "examined Japanese patent publication") describes the use of a modified polyurethane resin having a polyvalent OH group and $SO_3M$ (M represents an alkali metal ion or a quaternary ammonium ion) as a magnetic coating composition. By using such a binder, the surface gloss, blocking property and adhesion are improved.

With respect to the binder composed of polyurethane, JP-B-58-41565 describes a polyurethane binder having —$SO_3M$ using polyesterpolyol as polyol, JP-A-59-198530 describes a polyurethane binder obtained from polycarbonate having a hydroxy end group and diisocyanate and JP-A-62-201918 describes a polyurethane binder starting from carboxyl group-containing polycaprolactone. Further, JP-A-61-190717 describes a polyurethane binder starting from carboxyl group-containing polyether.

Although such a binder composed of polyurethane exerts excellent characteristics inherent to polyurethane, it is insufficient with respect to the dispersibility of ferromagnetic powder and the long-term storage stability and also it is inadequate in durability under conditions over a wide range of temperatures and humidities.

JP-A-61-104325, JP-A-62-121922 and JP-A-3-201211 describe examples of polyurethane containing polyether/polyesterpolyol. JP-A-61-104325 describes a urethane synthesized from diisocyanate and polyetheresterpolyol which is obtained by condensing (1) PTMG ($HO(C_2H_4$—O—$)_n$—H ($1 \leq n \leq 50$)), (2) diol having EO (ethylene oxide) and PO (propylene oxide) added to a phenolic OH and having a molecular weight of 1,000 or less and (3) an aromatic dicarboxylic acid (isophthalic acid). In other words, the polyether segment is readily associated because it has a blocking property but the polyester segment is hardly associated due to the lack of blocking property. When n is 1, the product is polyesterpolyol. In examples thereof, the polyether has a molecular weight of 650 or 1,000 and the polyether segment is readily associated due to the presence of blocking property but the polyester segment is not associated due to the lack of blocking property.

JP-A-62-121922 describes polyurethane having the same structure as that disclosed in JP-A-61-104325 Further, JP-A-

3-201211 describes polyurethane having a structure as blocking polyurethane comprising polyetherurethane having an OH end group and polyesterurethane connected to each other through diisocyanate and the polyesterurethane described is mainly polyesters having an ether bond therein. In the example of this technique, polycaprolactone polyester is used as polyesterpolyurethane. Accordingly, the object of this technique is to prevent the hydrolyzability and also in examples, improvement in the hydrolyzation durability is emphasized as an effect. The aromatic carboxylic acid used as the polyester component is enumeratively described in the detailed description, however, the feature of the invention doe not reside in achieving high glass transition point Tg.

The polyetherpolyurethane uses PEG (polyethylene glycol), PPG (polypropylene glycol) or PTMG (polytetramethylene glycol) as the starting materials for a long-chained polyol and it is excellent in the hydrolyzation durability. However, it is deficient in that the thermal deformation temperature (or Tg) is low and the mechanical strength is poor. JP-A-3-201211 discloses polyurethane using polyetherpolyol or polyesterpolyol as a long-chained polyol, however, the polyesterpolyol used is an aliphatic polyesterpolyol, therefore, it is insufficient in terms of the Tg and the mechanical strength and it is in need of improvement with respect to the physical properties. JP-A-3-201211 has a main object to improve the hydrolyzation durability of polyurethane and the polyurethane, when used as it is, cannot satisfy overall characteristics of the magnetic recording medium and is hardly durable in practical use.

Polyurethane using a long-chained diol obtained by esterifying polyetherpolyol with an aromatic dicarboxylic acid may be used so as to improve the heat durability and the Tg of polyetherurethane. The polyether segment thereof has a blocking property but the polyester segment does not have. According to this method, although the heat durability and the Tg may be improved, the polyurethane produced has a reduced ultimate elongation and is brittle, thus it provides no durability to the magnetic recording medium and it is inadequate in practical use. In other words, due to the brittle magnetic layer, the magnetic layer may fall as a debris at the edge portion of the tape during VTR running to cause dropout (DO) or the magnetic layer may crack at the tape edge portion during slitting of the tape to cause falling of powder or DO.

The present inventors have conducted intensive investigations on the structure of polyurethane and the kinds of ferromagnetic powder and as a result, they have found that a magnetic recording medium extremely excellent in electromagnetic conversion characteristics, durability and long-term storage stability can be obtained by a combination use of specific ferromagnetic powder and specific polyurethane.

SUMMARY OF THE INVENTION

An object of the present invention is to provide a magnetic recording medium having extremely high dispersibility, superior smoothness and electromagnetic conversion characteristics, excellent durability and curability and good long-term storage stability, in particular, a magnetic recording medium which has tape characteristics such as reduced DO occurrence on running at the initial or repeated use or after storage, provides low error rate at the digital recording, has superior durability because the magnetic layer has a large ultimate elongation and is not brittle, and when used as a recording medium for a system, such as β cam, D2 or D3,having a rotary head of high speed rotation, exhibits excellent running property and durability, does not crack at the edge portion upon slitting and causes little DO.

Other objects and effects of the present invention will be apparent from the following description.

The present invention relates to a magnetic recording medium comprising a non-magnetic support having thereon a magnetic layer comprising ferromagnetic powder and a binder, the ferromagnetic powder comprising a ferromagnetic metal powder comprising Fe and having a crystal size of from 120 to 250 Å and a Co content of from 5 to 40 atm %, and the binder comprises a polyurethane comprising a diol component and a polyisocyanate component, the diol component comprising a polyetherpolyol and a polyesterpolyol.

Preferred embodiments of the present invention include the following:

(1) A magnetic recording medium in which the polyurethane has at least two glass transition points Tg, one being from $-250°$ to $0°$ C., preferably from $-200°$ to $-10°$ C., more preferably from $-150°$ to $-20°$ C., and the other being from $40°$ to $130°$ C., preferably from $45°$ to $110°$ C., more preferably from $50°$ to $80°$ C.

(2) A magnetic recording medium in which the polyurethane contains in its molecule at least one polar group selected from $-SO_3M$, $-OSO_3M$, $-COOM$, $-PO_3M_2$, $-OPO_3M_2$, $-NR_2$, $-N^+R_3X^-$, $-N^+R_2R'SO_3^-$ and $-N^+R_2R'COO^-$, wherein M represents a hydrogen atom, an alkali metal ion selected from Li, K and Na, or an ammonium ion; R and R' each independently represents an alkyl group having from 1 to 12 carbon atoms; and X represents a halogen atom, in an amount of from $1\times10^{-6}$ to $1\times10^{-2}$ eq/g, preferably from $1\times10^{-5}$ to $5\times10^{-4}$ eq/g, more preferably from $2\times10^{-5}$ to $2\times10^{-4}$ eq/g.

(3) A magnetic recording medium in which the ferromagnetic powder has a saturation magnetization σs of from 100 to 170 emu/g, preferably from 110 to 150 emu/g, more preferably from 120 to 140 emu/g, and a coercive force Hc of from 1,500 to 2,600 Oe, preferably from 1,700 to 2,500 Oe, more preferably from 1,800 to 2,300 Oe.

(4) A magnetic recording medium in which the binder further comprises, in addition to the polyurethane, a vinyl chloride resin containing in its molecule at least one polar group selected from $-SO_3M$, $-OSO_3M$, $-COOM$, $-PO_3M_2$, $-OPO_3M_2$, $-NR_2$, $-N^+R_3X^-$, $-N^+R_2R'SO_3^-$ and $-N^+R_2R'COO^-$, wherein M represents a hydrogen atom, an alkali metal ion selected from Li, K and Na, or an ammonium ion; R and R' each independently represents an alkyl group having from 1 to 12 carbon atoms; and X represents a halogen atom, in an amount of from $1\times10^{-6}$ to $1\times10^{-3}$ eq/g, preferably from $1\times10^{-5}$ to $5\times10^{-4}$ eq/g, more preferably from $2\times10^{-5}$ to $2\times10^{-4}$ eq/g, and an epoxy group in an amount of from $1\times10^{-4}$ to $5\times10^{-3}$ eq/g, preferably from $5\times10^{-4}$ to $2\times10^{-3}$ eq/g.

DETAILED DESCRIPTION OF THE INVENTION

The ferromagnetic powder used in the present invention has high static magnetic characteristics (e.g., σs and Hc) and accordingly, is hardly dispersed and also, the magnetic coating solution agglomerates and cannot maintain the dispersion stability to thereby fail in exerting its inherent high magnetic performance. However, by using polyurethane of the present invention in combination with the ferromagnetic powder of the present invention, high dispersibility and high magnetic characteristics can be achieved. This is because, according to the combination in the present invention, the polyurethane exhibits high adsorption ability to ferromagnetic powder to provide good dispersibility and to prevent agglomeration and as a result, the ferromagnetic powder can exert its high magnetic characteristics.

At the same time, high durability can be achieved in the present invention. This is assumed because since the interfacial strength between the ferromagnetic powder and the binder is intensified due to the adsorption and the binder has a large mechanical strength, the durability is remarkably increased. In particular, although a high Tg resin is usually used for increasing the mechanical strength of the binder, the use of the high Tg binder renders smoothing of the magnetic layer by calendering difficult and high electromagnetic conversion characteristics cannot be achieved. The polyurethane of the present invention has a high Tg but since the polyether segment thereof is present in the blocking state, the surface of the magnetic layer can have superior fluidity, can readily be fluidized by smoothing and can have smoothness and as a result, high electromagnetic conversion characteristics can be achieved. At the final, a high density magnetic recording medium capable of sufficiently exerting high magnetic characteristics inherent to the ferromagnetic powder can be provided. According to the present invention, a magnetic recording medium having superior electromagnetic conversion characteristics, being excellent in repeated running property, undergoing little dropout and providing tapes having good storage stability can be obtained. In other words, the present invention provides polyurethane which is improved with respect to heat stability and Tg of the polyetherurethane, can maintain a large ultimate elongation, has a greatly improved durability, is freed of the above-described drawbacks of polyetherpolyurethane and is applicable as a binder of a magnetic recording medium.

More specifically stated about differences in the structure, JP-A-61-104325 and JP-A-62-121922 describe urethane formed from polyester obtained by esterifying polyetherpolyol, whereas the polyurethane of the present invention has a blocking property both in the polyether segment and the polyester segment. That is, the polyurethane of the present invention is composed of a low Tg polyetherpolyol component and a high Tg polyesterpolyol component. The low Tg polyetherpolyol has poor compatibility with the high Tg polyesterpolyol and accordingly, the produced polyurethane causes microphase separation in the coating into a soft and extensible phase having a low Tg and a hard phase having a high Tg. This is confirmed from the fact that the peak of the loss modulus (E") or loss factor (tanδ) reflecting the glass transition appears twice upon examining the temperature dependency of dynamic elasticity. Accordingly, the hard phase keeps heat durability and strength, while the soft phase enables a long elongation. When polyurethane is formed from long-chained polyol comprising a soft polyether segment and a hard segment in the mixed state as described in JP-A-61-104325 and JP-A-62-121922,the polyurethane has an almost uniform phase and exhibits medium properties with respect to the hardness, Tg and elongation. In other words, an increased Tg is associated with corresponding reduction in hardness, thus the hardness, high Tg and large elongation cannot be achieved at the same time. Accordingly, the resin of JP-A-61-104325 and JP-A-62-121922 is insufficient in durability when used as a binder but according to the present invention, the durability is greatly improved.

Due to the above-described peculiar properties, the heat durability, storage tackiness resistance and running durability (in particular, running durability in a magnetic recording system for a VHS or an 8 mm VTR with a rotary video head rotating at 1,800 r.p.m. so as to improve the magnetic recording density or for a high vision VTR or a digital VTR with a head rotating at a higher speed (3,600, 5,400, 7,200 or 9,000 r.p.m)) are improved. On the other hand, in order to increase the magnetic recording density, the ferromagnetic powder is also improved. Stated specifically, the particle needs be finely grained or a small amount of paramagnetic metal (e.g., Co, Cr or Ni) needs be added to Fe so as to increase the antimagneticity and flux density of the ferromagnetic powder. The ferromagnetic powder is generally inferior in durability and accordingly, a binder having good durability has been demanded. With a combination use of the binder of the present invention and the above-described ferromagnetic powder, a magnetic recording medium having a high magnetic recording density and greatly improved durability is first achieved. In a particularly effective aspect, the ferromagnetic powder has a Co content of from 5 to 40 atm %, preferably from 8 to 30 atm %, more preferably from 9 to 25 atm %. This is assumed because the polyetheresterurethane of the present invention is remarkably enhanced in the adsoptivity to the ferromagnetic powder due to the Co contained in the powder.

With a combination use of the polyetheresterurethane of the present invention and ferromagnetic metal powder containing from 5 to 40 atm % of Co, the durability is increased and the brittleness is improved, whereby the edge crack upon slitting is improved, DO is reduced and DO occurrence in running is also improved.

When the Tg of the binder is increased, in general, (1) smoothing by calendering becomes difficult or (2) the curing property is worsened, however, according to the present invention, due to the presence of a fluidizable phase in the polyether block segment, the calendering formability is not reduced or the curing property is not deteriorated, which also gives rise to a magnetic recording medium having high electromagnetic conversion characteristics and good durability. The curing property is preferably further improved by increasing the branched OH group. The dispersibility is very good because the ferromagnetic powder has a Co content of from 5 to 40 atm % and the binder exhibits high adsorption thereto. The incorporation of a polar group such as $SO_3M$, $PO_3M_2$ or COOM (M is a metal or ammonium) into the binder is preferred to achieve further improvement.

The polyurethane used in the present invention has the following characteristics. The polyurethane has a yield stress of from 2 to 15 kg/mm$^2$, preferably from 3 to 12 kg/mm$^2$, more preferably from 4 to 10 kg/mm$^2$. The ultimate elongation thereof is from 100 to 2,000%, preferably from 200 to 1,500%, more preferably from 300 to 1,000%. The polyurethane has from 3 to 20,preferably from 3.5 to 10, more preferably 4 to 6 OH groups per molecule. If the OH group number is small, the curing property is reduced and the durability becomes poor. The polyetherpolyol used in the polyurethane preferably has a structure comprising a composition of PO and/or EO-added PPG (polypropylene glycol), PTMG (polytetramethylene glycol), PEG (polyethylene glycol) or bisphenol A or a mixture thereof. PPG and PTMG are particularly preferred. The glass transition temperature (Tg) is from −250° to 0° C. and the molecular weight is preferably from 500 to 5,000,more preferably from 800 to 3,000Examples of the polyetherpolyol include aliphatic polyethers such as polyethylene oxide, polypropylene oxide and polytetramethylene glycol and aromatic polyethers obtained by adding ethylene oxide or propylene oxide to an aromatic glycol such as bisphenol A. The polyetherpolyol has a molecular weight preferably of from 500 to 3,000 If it is smaller than this range, the adhesion to the non-magnetic support is weakened, whereas if it is larger than this range, the dispersibility is reduced. Due to the presence of the polyetherpolyol, the affinity for the non-magnetic support such as PET (polyethylene terephthalate) or PEN (polyethylene naphthalate) increases to improve the adhesion.

The polyesterpolyol used in the polyurethane preferably has a structure comprising monomers having a cyclic structure (e.g., aromatic or alicyclic ring) or those having a branched structure among monomer raw materials described in JP-A-3-201211 Specifically, the acid component is preferably an isophthalic acid or a terephthalic acid and the alcohol component is preferably neopentyl glycol, cyclohexanedimethanol, cyclohexanediol, bisphenol A or hydrogenated bisphenol A. The polyesterpolyol has a molecular weight preferably of from 500 to 5,000, more preferably from 800 to 3,000 The low molecular diol as the chain extending agent used in the polyurethane may be those described in JP-A-3-201211. A trifunctional or greater functional alcohol such as trimethylolpropane may be used together to form polyurethane having a branched structure.

The polyurethane of the present invention comprises as main components a diol component comprising polyetherpolyol and polyesterpolyol and a polyisocyanate component. Examples of the polyisocyanate include aromatic polyisocyanates such as MDI (4,4'-diphenylmethane diisocyanate), 2,4-TDI (TDI: tolylene diisocyanate), 2,6-TDI, 1,4-XDI (XDI: xylylene diisocyanate), 1,3-XDI, 4,4'-diphenyl ether diisocyanate, 2-nitrodiphenyl-4,4'-diisocyanate, 2,2'-diphenylpropane diisocyanate, 3,3'-dimethyldiphenyl-methane-4, 4'-diisocyanate, 4,4'-diphenylpropane diisocyanate, m-phenylene diisocyanate, p-phenylene diisocyanate, naphthalene-1,4-diisocyanate, naphthalene-1,5-diisocyanate and 3,3'-dimethoxydiphenyl-4,4'-diisocyanate, aliphatic diisocyanates such as tetramethylene diisocyanate, hexamethylene diisocyanate and lysine diisocyanate, and allcyclic diisocyanate such as isophorone diisocyanate (IPDI), hydrogenated tolylene diisocyanate and hydrogenated diphenyl-methane diisocyanate. Since the polyolefinepolyol segment is soft, physical properties can be controlled more easily by using an aromatic diisocyanate. The diisocyanate used in the polyurethane is preferably an aromatic or alicyclic diisocyanate such as TDI, MDI, IPDI or hydrogenated MDI.

In the polyurethane of the present invention, the ratio of the diol component to the isocyanate component (diol/isocyanate) is generally from 9/1 to 1/9 by weight, preferably from 8/2 to 2/8 by weight. In the diol component, the ratio of the polyesterpolyol to the polyetherpolyol (polyesterpolyol/polyetherpolyol) is generally from 95/5 to 50/50 by weight, preferably from 90/10 to 60/40 by weight.

In addition to the polyol and the polyisocyanate, additives such as a chain extending agent may be added and examples of the chain extending agent include glycols such as ethylene glycol, 1,4-butanediol, 2,3-butanediol, neopentyl glycol, dihydroxyethyl ether of bisphenol A and hydroquinonedihydroxyethyl ether and diamines such as diphenyl-methanediamine and m-phenylenediamine. The amount of the chain extending agent is generally from 0 to 40 wt %, preferably from 5 to 30 wt %, based on the amount of the polyurethane.

The molecular end of polyurethane is preferably an OH group. The OH group reacts with the isocyanate curing agent in the magnetic layer to make a bridge to thereby reinforce the coating strength of the magnetic layer.

The binder comprising polyurethane of the present invention preferably contains at least one polar group selected from $-SO_3M$, $-OSO_3M$, $-COOM$, $-PO_3M_2$, $-OPO_3M_2$, $-NR_2$, $-N^+R_3X^-$, $-N^+R_2R'SO_3^-$, $-N^+R_2R'COO^-$ (wherein M represents a hydrogen atom, an alkali metal ion selected from Li, K and Na, an ammonium ion, R and R' each independently represents an alkyl group having from 1 to 12 carbon atoms, and X represents a halogen atom) in an amount of from $1\times10^{-6}$ to $1\times10^{-3}$ eq/g, preferably from $1\times10^{-5}$ to $5\times10^{-4}$ eq/g, more preferably from $2\times10^{-5}$ to $2\times10^{-4}$ eq/g. If the amount is larger than $1\times10^{-3}$ eq/g, the viscosity increases to cause reduction in the dispersibility, whereas if it is less than $1\times10^{-6}$ eq/g, the dispersibility readily decreases.

The polyurethane has a weight average molecular weight of from 1 to 200,000, preferably from 2 to 150,000, more preferably from 3 to 100,000 If the weight average molecular weight is larger than this range, the viscosity is high and the dispersibility decreases, whereas if it is less than this range, the mechanical strength is reduced to cause deterioration of the durability.

The polyurethane compound used in the present invention is prepared by dissolving a polyol component (a mixture of polyesterpolyol and polyetherpolyol), a chain-extending agent (e.g., neopentyl glycol, 1,4-butanediol), a sulfonic acid-containing diol compound (e.g., 5-sodium sulfoisophthalic acid di(β-hydroxyethyl)) and the like into a solvent such as toluene, cyclohexanone, dimethylacetamide or a mixture thereof, heating the mixture at from 60° to 90° C, adding thereto a catalyst (e.g., di-n-butyltin dilaurate) and then adding a polyisocyanate component (e.g., MDI, TDI) to the solution dissolved in the above-described catalyst to effect a reaction for urethanation.

In the binder used for the magnetic layer of the present invention, a vinyl chloride-based synthetic resin or a synthetic resin described below may be used in combination with the polyurethane of the present invention. The vinyl chloride resin which can be used in combination has a polymerization degree of from 200 to 1,000, more preferably from 250 to 500 The vinyl chloride resin contains in the molecule at least one polar group selected from $-SO_3M$, $-OSO_3M$, $-COOM$, $-PO_3M_2$, $-OPO_3M_2$, $-NR_2$, $-N^+R_3X^-$, $-N^+R_2R'SO_3^-$ and $-N^+R_2R'COO^-$ (wherein M represents a hydrogen atom, an alkali metal ion selected from Li, K and Na or an ammonium ion, R and R' each independently represents an alkyl group having from 1 to 12 carbon atoms and, X represents a halogen atom) in an amount of from $1\times10^{-6}$ to $1\times10^{-3}$ eq/g, preferably $1\times10^{-5}$ to $5\times10^{-4}$ eq/g, more preferably from $2\times10^{-3}$ to $2\times10^{-4}$ eq/g. If the amount is larger than this range, the viscosity is high and the dispersibility decreases, whereas if it is less than this range, the dispersibility decreases. The vinyl chloride resin further contains in the molecule an epoxy group in an amount preferably of from $1\times10^{-4}$ to $5\times10^{-3}$ eq/g, more preferably from $5\times10^{-4}$ to $2\times10^{-3}$ eq/g. For example, MR110 contains $7.6\times10^{-4}$ eq/g of epoxy group per molecule. The vinyl chloride resin may be a copolymer of a vinyl monomer such as vinyl acetate, vinyl alcohol, vinylidene chloride or acrylonitrile. In addition, examples of the monomer copolymerizable with the vinyl chloride include vinyl monomers such as (meth)acrylic acid alkyl ester, vinyl carboxylate, allyl ether, styrene and glycidyl (meth)acrylate.

In addition to the vinyl chloride resin, various synthetic resins may be used in combination with the polyurethane of the present invention for forming respective magnetic layers. Examples thereof include an ethylene-vinyl acetate copolymer, a cellulose derivative such as nitrocellulose resin, an acrylic resin, a polyvinyl acetal resin, polyvinyl butyral resin, an epoxy resin and a phenoxy resin. These may be used individually or in combination.

The above-described polar group is also preferably incorporated into these resins used in combination with polyurethane of the present invention.

When other synthetic resins are used in combination, the polyurethane of the present invention contained in the magnetic layer preferably accounts for from 10 to 90 wt %, more preferably from 20 to 70 wt %, most preferably from 25 to 60 wt % of the binder. The vinyl chloride resin preferably accounts for from 10 to 80 wt %, more preferably from 20 to 70 wt %, most preferably from 30 to 60 wt % of the binder.

A curing agent such as a polyisocyanate compound may be used in combination with the binder of the present invention. Examples of the polyisocyanate compound include a reaction product of 3 mols of tolylene diisocyanate with 1 mol of trimethylolpropane (e.g., Desmodur L-75, produced by Bayer Co.), a reaction product of 3 mols of diisocyanate such as xylylene diisocyanate or hexamethylene diisocyanate with 1 mol of trimethylolpropane, a biuret adduct to 3 mols of hexamethylene diisocyanate, an isocyanurate compound of 5 mols of tolylene diisocyanate, an isocyanurate adduct of 3 mols of tolylene diisocyanate and 2 mols of hexamethylene diisocyante and a polymer of isophorone diisocyanate or diphenylmethane diisocyanate.

The polyisocyanate compound contained in the magnetic layer is preferably incorporated into the binder in an amount of from 10 to 50 wt %, more preferably from 20 to 40 wt %.

In effecting curing with irradiation of electron beams, a compound having a reactive double bond (e.g., urethane acrylate) may be used.

The total weight of the resin component and the curing agent (namely, the weight of the binder) is in usual preferably from 15 to 40 parts by weight, more preferably from 20 to 30 parts by weight, per 100 parts by weight of the ferromagnetic powder.

The above-described resin component, curing agent and ferromagnetic powder are kneaded and dispersed together with a solvent usually employed in the preparation of a magnetic coating composition, such as methyl ethyl ketone, dioxane, cyclohexanone or ethyl acetate, to prepare a magnetic coating composition. The kneading and dispersion may be conducted according to a conventional method.

The ferromagnetic powder used in the present invention has a crystal size of from 120 to 250 Å, preferably from 130 to 220 Å, more preferably from 140 to 200 Å. The longer axis length thereof is generally from 0.05 to 0.25 µm, preferably from 0.07 to 0.20 µm, more preferably from 0.07 to 0.20 µm. The BET specific surface area $S_{BET}$ thereof is generally from 50 to 80 m$^2$/g, preferably from 55 to 70 m$^2$/g. The ferromagnetic powder has a Co content of from 5 to 40 atm %, preferably from 8 to 30 atm %, more preferably from 9 to 25 atm %, and it is a ferromagnetic metal powder mainly comprising Fe. It may also contain a trace amount of metal such as Cr, Ni, Mn, Zn, Sr or Nd. The saturation magnetization σs thereof is preferably from 100 to 170 emu/g, preferably from 110 to 150 emu/g, more preferably from 120 to 140 emu/g. The coercive force Hc thereof is generally from 1,500 to 2,600 Oe, preferably from 1,700 to 2,500 Oe, more preferably from 1,800 to 2,300 Oe. The ferromagnetic powder is preferably an acicular ferromagnetic powder having a ratio of the longer axis length to the shorter axis length of from 2 to 12, preferably from 4 to 10, more preferably from 5 to 8. If the ratio is larger than this range, the smoothness tends to be lowered to deteriorate the electromagnetic conversion characteristics and when combined with the binder of the present invention, the durability may be decreased.

In addition to the above-described ingredients, the magnetic coating composition may contain additives or fillers conventionally used (as described, e.g., in JP-A-63-146210 and JP-A-63-187418), for example, an abrasive such as $\alpha$-$Al_2O_3$ or $Cr_2O_3$, an antistatic agent such as carbon black, a lubricant such as fatty acid, fatty acid ester or silicone oil, or a dispersant. The addition amount of the additives and the fillers is generally from 0.1 to 10 parts by weight, preferably from 1 to 5 pats by weight, per 100 parts by weight of the ferromagnetic powder.

A magnetic coating solution prepared from the above-described materials is coated on a non-magnetic support to form a magnetic layer. Preferred examples of the non-magnetic support include polyethylene terephthalate, polyethylene naphthalate, and aramid (polyimide resins).

The present invention may be applied to a magnetic recording medium having provided therein a plurality of layers composed of, for example, an upper magnetic layer and an lower magnetic layer or a lower non-magnetic layer, and with respect to the construction of respective layers and materials used therein such as ferromagnetic powder, a binder, an abrasive, a lubricant and an antistatic agent, those described in JP-A-63-146210 and JP-A-63-187418 may be used.

The magnetic recording medium of the present invention may be produced, for example, by coating a coating solution for the magnetic layer on the surface of a running non-magnetic support to give a dry thickness of the magnetic layer of from 0.05 to 10 µm, preferably from 0.2 to 5.0 µm. In the case of a multi-layer structure, plural magnetic coating solutions may be coated in a superposing fashion one by one or at the same time.

The above-described magnetic coating solution may be coated using a coater such as air doctor coater, blade coater, rod coater, extrusion coater, air knife coater, squeeze coater, impregnation coater, reverse roll coater, transfer roll coater, gravure coater, kiss coater, cast coater, spray coater or spin coater.

With respect to these coaters, for example, *Saishin Coating Gijutsu* (Newest Coating Techniques), published Sogo Gijutsu Center (May 31, 1983) may be referred to.

When the present invention is applied to a magnetic recording medium composed of two or more layers, examples of the coating apparatus and coating method include the following:

(1) A lower layer is first coated by means of a coating apparatus usually employed in the coating of a magnetic coating solution, such as gravure coater, roll coater, blade coater or extrusion coater and then, in the state of the lower layer being wet, an upper layer is coated thereon by means of an extrusion coating apparatus of support press type disclosed in JP-A-1-46186, JP-A-60-238179 and JP-A-2-265672.

(2) An upper layer and a lower layer is coated almost simultaneously by means of a coating head having provided therein two slits for passing the coating solutions as disclosed in JP-A-63-88080, JP-A-2-17971 and JP-A-2-265672.

(3) An upper layer and a lower layer is coated almost simultaneously by means of an extrusion coating apparatus with backup rolls disclosed in JP-A-2-174965.

The non-magnetic support used in the present invention may have a back layer (backing layer) provided on the surface not applied with the magnetic coating solution. The back layer is usually provided and formed on the surface of a non-magnetic support, whereon the magnetic coating solution is not applied, by coating a coating solution for back layer comprising an organic solvent having dispersed therein particle ingredients such as an abrasive or an antistatic agent and a binder.

Further, adhesive layers may be provided on the surface of the non-magnetic support, on which a magnetic coating composition or a coating composition for forming the back layer is applied.

After coating, the layer coated with the magnetic coating solution is subjected to the magnetic orientation of the ferromagnetic powder contained therein and then dried.

The thus dried coated layer is subjected to surface smoothing. The surface smoothing may be carried out, for example, by means of a supercalender roll. By effecting the surface smoothing, holes generated after the removal of solvent at the drying vanish to increase the filling rate of the ferromagnetic powder in the magnetic layer, whereby a magnetic recording medium having high electromagnetic conversion characteristics can be obtained.

The magnetic recording medium of the present invention preferably has a surface imparted with an extremely superior smoothness such that the center line average height on the surface is from 0.5 to 4 nm, preferably from 1 to 3 nm, at the cutoff of 0.25 mm. To achieve such a surface, the recording layer formed from the above-described specific ferromagnetic powder and specific binder is subjected, for example, to the above-described calendering. The calendering is carried out under conditions that the calender roll temperature is from 60° to 100° C, preferably from 70° to 100° C, more preferably from 80 to 100° C. and the pressure is from 100 to 500 kg/cm, preferably from 200 to 450 kg/cm, more preferably from 300 to 300 kg/cm.

The thus cured medium is then formed into a desired shape. The cutting can be conducted by means of a conventional cutter such as a slitter under usual conditions.

The present invention will be described in greater detail with reference to the following examples, but the present invention should not be construed as being limited thereto. Unless otherwise indicated, "part" means "part by weight".

EXAMPLES 1 TO 9 AND COMPARATIVE EXAMPLES 1 TO 8

100 Parts of ferromagnetic alloy powder comprising 92 atm % of Fe and 8 atm % of Co and having Hc of 1800 Oe, σs of 130 emu/g, a crystal size of 165 Å and a longer axis length of 0.12 µm were ground in an open kneader for 10 minutes and then therewith 8 parts of a vinyl chloride resin containing a polar group represented by $SO_3M$ wherein M is Na or K and an epoxy group (MR110,produced by Nippon Zeon Co., Ltd.) and 40 parts of methyl ethyl ketone were kneaded for 60 minutes. Thereafter, 8 parts (as solid content) of polyurethane (as described in Table 1), 2 parts of an abrasive ($Al_2O_3$, particle size: 0.3 µm), 2 parts of carbon black (particle size: 40 nm) and 200 parts of methyl ethyl ketone/cyclohexanone (1/1) were added thereto and dispersed for 120 minutes in a sand mill. Further, 4 parts (as solid content) of polyisocyanate (Collonate 3041, produced by Nippon Polyurethane Co., Ltd.), 2 parts of butoxyethyl stearate, 1 part of stearic acid amide and 50 parts of methyl ethyl ketone were added thereto and mixed with stirring for 20 minutes and then the mixture was filtered through a filter having an average pore size of 1 µm to prepare a magnetic coating composition. The obtained magnetic coating solution was coated on the surface of a 8 µm-thick aramid support by means of a reverse roll to give a dry thickness of 2 µm and the following back solution was coated on the opposite surface to give a thickness of 0.5 µm and dried. The nonmagnetic support coated with the magnetic coating solution, in the state of the magnetic coating solution being not dried, was subjected to magnetic orientation by a magnet of 3000 gauss and after drying the coating, it was calendered by a metal roll and metal roll combination through 5 stages at a speed of 100 m/min, under a linear pressure of 300 kg/cm and at a temperature of 90° C., and then slit at a rate of 200 m/min to produce video tapes.

| Back Solution Composition | |
|---|---|
| Carbon black (particle size: 18 nm) | 100 parts |
| Nitrocellulose (RS1/2H, produced by Dicel Co. Ltd.) | 60 parts |
| Polyurethane (N-2301, produced by Nippon Polyurethane Co., Ltd.) | 60 parts |
| Polyisocyanate (Collonate L, produced by Nippon Polyurethane Co., Ltd.) | 20 parts |
| Methyl ethyl ketone | 1,000 parts |
| Toluene | 1,000 parts |

Details of urethane used in Examples and Comparative Examples are shown in Table 1 and Table 2 below. In Table 1 and Table 2, DEIS indicates —$SO_3Na$-containing diol.

TABLE 1

| Polyurethane Composition | A | B | C | D |
|---|---|---|---|---|
| Polyol 1 | | | | |
| Composition (molar ratio) | PPG | PTMG | iPA/NPG/PCL (1/1/8) | PPG |
| Molecular weight | 2,000 | 2,000 | 2,000 | 2,000 |
| Tg (°C.) | −75 | −84 | 8 | −75 |
| Mol | 0.023 | 0.023 | 0.046 | 0.046 |
| Polyol 2 | | | | |
| Composition (molar ratio) | iPA/NPG/EG (5/5/0.1) | iPA/NPG/CHM (4.9/4/1.1) | — | — |
| Molecular weight | 2,000 | 2,000 | | |
| Tg (°C.) | 55 | 62 | | |

TABLE 1-continued

| Polyurethane Composition | A | B | C | D |
|---|---|---|---|---|
| Mol | 0.023 | 0.023 | | |
| Chain extending agent (mol) | NPG (0.06) | XDI (0.06) | NPG (0.06) | NPG (0.06) |
| DEIS (mol) | 0.009 | 0.009 | 0.009 | 0.009 |
| Diisocyanate (mol) | MDI (0.1) | XDI (0.1) | MDI (0.1) | MDI (0.1) |
| Weight average molecular weight | 3.5 | 5.8 | 3.5 | 3.5 |
| Tg of urethane (°C.) | 62, −17 | 68, −25 | 32 | −48 |

TABLE 2

| Polyurethane Composition | E | F | G | H |
|---|---|---|---|---|
| Polyol 1 | | | | |
| Composition (molar ratio) | PTMG/BPA—EO/PCL (7/3/3.2) | PPG/NPG/PCL | PTMG (1/1/8) | BPA—EO/PTMG (1/3) |
| Molecular weight | 2,000 | 2,000 | 2,000 | 2,000 |
| Tg (°C.) | 31 | 40 | −84 | 10 |
| Mol | 0.046 | 0.023 | 0.023 | 0.023 |
| Polyol 2 | | | | |
| Composition (molar ratio) | — | PCL/NPG/MID (1/4/4.8) | NPG/Ad/iPA (4.9/4/1.1) | iPA/NPG/EG (5/5/0.1) |
| Molecular weight | | 2,000 | 2,000 | 2,000 |
| Tg (°C.) | | −26 | 20 | 55 |
| Mol | | 0.023 | 0.023 | 0.023 |
| Chain extending agent (mol) | NPG (0.06) | NPG (0.06) | NPG (0.06) | NPG (0.06) |
| DEIS (mol) | 0.009 | 0.009 | 0.009 | 0.009 |
| Diisocyanate (mol) | MDI (0.1) | MDI (0.1) | MDI (0.1) | MDI (0.1) |
| Weight average molecular weight | 5.3 | 1.95 | 7.1 | 6.3 |
| Tg of urethane (°C.) | 61 | −6 | 33, −25 | 60, 15 |

Note:
iPA: isophthalic acid
NPG: neopenthylglycol
PCL: polycaprolactone
EG: ethyleneglycol
CHM: cyclohexanedimethanol
BPA—EO: ethyleneoxide adduct of bisphenol A

EXAMPLE 1

The ferromagnetic powder had a Co content of 9 atm % and the polyurethane used was polyetheresterurethane (Urethane A) using PPG. Other conditions were the same as in the above-described formulation.

EXAMPLE 2

Example 1 was repeated except for changing the ferromagnetic powder of Example 1 to have a composition of 95% of Fe and 5 atm % of Co.

EXAMPLE 3

Example 1 was repeated except for using polyurethane of polyetherpolyester using PTMG (Urethane B).

COMPARATIVE EXAMPLE 1

Example 1 was repeated except for changing the ferromagnetic powder in Example 1 to have the composition of of Fe and 4 atm % of Co.

COMPARATIVE EXAMPLE 2

Example 1 was repeated except for using polyesterpolyurethane (Urethane C) in place of Urethane A.

COMPARATIVE EXAMPLE 3

Example 1 was repeated except for using polyetherpolyurethane (Urethane D) in place of Urethane A.

COMPARATIVE EXAMPLE 4

Example 1 was repeated except for changing the crystal size of the ferromagnetic powder to 280 Å.

COMPARATIVE EXAMPLE 5

Example 1 was repeated except for using polyetheresterpolyurethane (non-blocking) described in JP-A-62-121922 (Urethane E) in place of Urethane A.

COMPARATIVE EXAMPLE 6

Example 1 was repeated except for using polyurethane described in JP-A-3-201211 which urethane did not have two Tg points (Urethane F) in place of Urethane A.

EXAMPLE 4

Example 1 was repeated except for using butyl stearate as a lubricant.

EXAMPLE 5

Example 1 was repeated except for using urethane having Tg points at −20° C. (polyether segment) and at 30° C. (polyester segment) (Urethane G) in place of Urethane A.

EXAMPLE 6

Example 1 was repeated except for using urethane having Tg points at 10° C. (polyether segment) and at 60° C. (polyester segment) (Urethane H) in place of Urethane A.

EXAMPLE 7

Example 1 was repeated except for changing the ferromagnetic powder of Example 1 to have a composition of 65% of Fe and 35 atm % of Co.

COMPARATIVE EXAMPLE 7

Example 1 was repeated except for changing the ferromagnetic powder of Example 1 to have a composition of 50% of Fe and 50 atm % of Co.

EXAMPLE 8

Example 1 was repeated except for changing the crystal size of the ferromagnetic powder to 250 Å.

EXAMPLE 9

Example 1 was repeated except for changing the crystal size of the ferromagnetic powder to 120 Å.

COMPARATIVE EXAMPLE 8

Example 1 was repeated except for changing the crystal size of the ferromagnetic powder to 100 Å.

Various properties of the resulting video tapes were evaluated as follows.

(1) Electromagnetic conversion characteristics:

A signal of 32 MHz was recorded on each sample tape using D2 system video tape recorder (DVR10, manufactured by Sony Corporation) and then played back. The playback output was determined relatively to the playback output of the signal of 32 MHz recorded on a standard tape (Example 1) taken as 0 dB.

(2) Surface roughness (Ra):

The center line average height (Ra) was determined according to the light interference method by means of Digital Optical Profimeter (manufactured by WYKO Co., Ltd.) at the cutoff of 0.25 mm.

(3) Slit crack:

Each sample tape was slit at 200 m/min and the edge portion thereof was observed through a differential interference microscope at a magnification of 400 and when crack was observed, the rating was D and when no crack was observed, the rating was A.

(4) Repeated running:

Each of 64 min-length tapes was subjected to continuous and repeated running 100 times using the above-described VTR, and then DO occurrence was determined, contamination of the video head was observed and the edge after running was observed.

(Contamination of video head)

A: Contamination was not observed at all.

B: 10% or less of areas was contaminated.

C: 30% or less of areas was contaminated.

D: More than 30% of areas was contaminated.

(5) Storage stability:

Each of sample tapes were stored in a M64 cassette for 7 days under conditions of 60° C. and 90% RH and then the error rate was determined at 23° C by running it in the above-described VTR.

(6) Dropout:

Each of tapes at the initial use, after repeated running or after storage was subjected to running in the above-described VTR and the frequency of reduction in the output by 5 μsec or more was measured by a dropout counter.

(7) Tg:

A film composed only of a binder resin was formed to have a thickness of 20 μm and the peak temperature of E" was determined by Vibron (manufactured by Orientech Co., Ltd.).

The results obtained are shown in Tables 3 and 4 below.

TABLE 3

| | Polyurethane | Ferromagnetic Powder | Lubricant | Initial Output (dB) | Surface Roughness (nm) | Slit Crack | Edge after Running |
|---|---|---|---|---|---|---|---|
| Example 1 | A | | | 0.0 | 3 | A | no change |
| Example 2 | A | different kind | | −0.5 | 3 | A | no change |
| Example 3 | B | | | +0.1 | 3 | A | no change |
| Comp. Ex. 1 | A | different kind | | −3.0 | 3 | A | no change |
| Comp. Ex. 2 | C | | | −1.5 | 5 | D | debris dropped |
| Comp. Ex. 3 | D | | | −1.2 | 4 | D | contaminated |
| Comp. Ex. 4 | A | different kind | no lubricant | −3.5 | 5 | A | no change |
| Comp. Ex. 5 | E | | | −2.1 | 5 | D | debris dropped |
| Comp. Ex. 6 | F | | | −2.8 | 5 | D | contaminated |
| Example 4 | A | | | −0.3 | 3 | A | no change |
| Example 5 | G | | | −0.4 | 3 | A | slightly contaminated |
| Example 6 | H | | | −0.5 | 3 | A | slightly contaminated |
| Example 7 | A | different kind | | +0.4 | 3 | A | no change |
| Comp. Ex. 7 | A | different kind | | +0.3 | 4 | D | debris dropped |
| Example 8 | A | different kind | | −0.3 | 3 | A | no change |

TABLE 3-continued

|  | Poly-urethane | Ferromagnetic Powder | Lubricant | Initial Output (dB) | Surface Roughness (nm) | Slit Crack | Edge after Running |
|---|---|---|---|---|---|---|---|
| Example 9 | A | different kind |  | +0.3 | 3 | A | no change |
| Comp. Ex. 8 | A | different kind |  | −1.2 | 4 | A | no change |

TABLE 4

|  | Poly-urethane | Ferromagnetic Powder | Lubricant | Initial DO (number/min) | DO after Running (number/min) | Contamination of Head after Running | DO after Storage (number/min) |
|---|---|---|---|---|---|---|---|
| Example 1 | A |  |  | 6 | 8 | A | 6 |
| Example 2 | A | different kind |  | 5 | 8 | A | 6 |
| Example 3 | B |  |  | 7 | 9 | A | 7 |
| Comp. Ex. 1 | A | different kind |  | 30 | 67 | C | 60 |
| Comp. Ex. 2 | C |  |  | 159 | 433 | D | 211 |
| Comp. Ex. 3 | D |  |  | 216 | 389 | D | 365 |
| Comp. Ex. 4 | A | different kind | no lubricant | 27 | 64 | C | 64 |
| Comp. Ex. 5 | E |  |  | 186 | 450 | D | 210 |
| Comp. Ex. 6 | F |  |  | 58 | 348 | D | 289 |
| Example 4 | A |  |  | 10 | 19 | B | 10 |
| Example 5 | G |  |  | 11 | 18 | B | 15 |
| Example 6 | H |  |  | 12 | 22 | B | 16 |
| Example 7 | A | different kind |  | 10 | 18 | A | 12 |
| Comp. Ex. 7 | A | different kind |  | 65 | 196 | D | 258 |
| Example 8 | A | different kind |  | 13 | 21 | A | 18 |
| Example 9 | A | different kind |  | 8 | 16 | A | 21 |
| Comp. Ex. 8 | A | different kind |  | 12 | 19 | B | 25 |

As is clearly seen from the results in Table 3 and Table 4, sample tapes according to the present invention exhibited excellent characteristics in all evaluation items, that is, with respect to the initial output, surface roughness, slit crack, edge property after running, initial dropout (DO), DO after running, head contamination after running and DO after storage. Further, samples comprising polyurethane and/or ferromagnetic powder outside the scope of the present invention were inferior in many evaluation items above.

The magnetic recording medium of the present invention comprises in the magnetic layer, as a ferromagnetic powder, a ferromagnetic metal powder mainly composed of Fe and having a crystal size of from 120 to 250 Å and a Co content of from 5 to 40 atm % and, as a binder, urethane comprising a diol component composed of polyetherpolyol and polyesterpolyol and a polyisocyanate component as main components, thereby it can have very high dispersibility, superior smoothness and electromagnetic conversion characteristics, excellent durability and curability, and good long-term storage stability. In particular, with respect to tape characteristics, it undergoes little occurrence of DO on running at the initial or repeated use or after storage, exhibits low error rate in digital recording, and has superior durability because it has a large ultimate elongation and is not brittle, and also, in the use for a system such as β-cam, D2 or D3 having a rotary head of high rotation, the magnetic recording medium exhibits superior running and durability, is freed from cracks at the edge portion on slitting and causes little DO.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a magnetic layer comprising ferromagnetic powder and a binder, said ferromagnetic powder comprising a ferromagnetic metal powder comprising Fe and having a crystal size of from 120 Å to 250 Å and a Co content of from 5 to 40 atom %, and said binder comprises a polyurethane comprising a diol component and a polyisocyanate component, said diol component comprising a polyetherpolyol and a polyesterpolyol wherein said polyetherpolyol has a glass transition point in the range of −250° to 0° C. and said polyesterpolyol has a glass transition point in the range of 40° C. to 130° C.

2. A magnetic recording medium as claimed in claim 1, wherein said polyurethane contains in its molecule at least one polar group selected from $-SO_3M$, $-OSO_3M$, $-COOM$, $-PO_3M_2$, $-OPO_3M_2$, $-NR_2$, $-N^+R_3X^-$, $-N^+R_2R'SO_3^-$ and $-N^+R_2R'COO^-$, wherein M represents a hydrogen atom, an alkali metal ion selected from Li, K and Na, or an ammonium ion; R and R' each independently represents an alkyl group having from 1 to 12 carbon atoms; and X represents a halogen atom, in an amount of from $1 \times 10^{-6}$ to $1 \times 10^{-3}$ eq/g.

3. A magnetic recording medium as claimed in claim 1, wherein said ferromagnetic powder has a saturation magnetization σs of from 100 to 170 emu/g and a coercive force Hc of from 1,500 to 2,600 Oe.

4. A magnetic recording medium as claimed in claim 1, wherein said binder further comprises, in addition to said polyurethane, a vinyl chloride resin containing in its molecule at least one polar group selected from $-SO_3M$, $-OSO_3M$, $-COOM$, $-PO_3M_2$, $-OPO_3M_2$, $-NR_2$, $-N^+R_3X^-$, $-N^+R_2R'SO_3^-$ and $-N^+R_2R'COO^-$, wherein M represents a hydrogen atom, an alkali metal ion selected from Li, K and Na, or an ammonium ion; R and R' each independently represents an alkyl group having from 1 to 12 carbon atoms; and X represents a halogen atom, in an amount of from $1 \times 10^{-6}$ to $1 \times 10^{-3}$ eq/g and an epoxy group in an amount of from $1 \times 10^{-4}$ to $5 \times 10^{-3}$ eq/g.

* * * * *